United States Patent
Lindholm et al.

(10) Patent No.: US 7,470,296 B2
(45) Date of Patent: Dec. 30, 2008

(54) COATED INSERT AND METHOD OF MAKING SAME

(75) Inventors: Mikael Lindholm, Varby (SE); Markus Rodmar, Vallentuna (SE); Anders Jonsson, Gavle (SE)

(73) Assignee: Sandvik Intellectual Property AB, Sandviken (SE)

( * ) Notice: Subject to any disclaimer, the term of this patent is extended or adjusted under 35 U.S.C. 154(b) by 301 days.

(21) Appl. No.: 11/179,481

(22) Filed: Jul. 13, 2005

(65) Prior Publication Data
US 2006/0029831 A1 Feb. 9, 2006

(30) Foreign Application Priority Data
Jul. 13, 2004 (SE) .................................. 0401868

(51) Int. Cl.
  B23B 27/14 (2006.01)
  C23C 16/40 (2006.01)
(52) U.S. Cl. .................. 51/307; 51/309; 156/89.11; 156/89.16; 407/119; 427/249.1; 427/255.7; 427/255.11; 427/255.28; 427/255.29; 427/255.391; 427/348; 427/368; 427/419.2; 427/419.7; 428/212; 428/216; 428/336; 428/698; 428/701; 428/702
(58) Field of Classification Search .................. 51/307, 51/309; 407/119; 428/212, 216, 336, 698, 428/701, 707, 702; 156/89.11, 89.16; 427/248.1, 427/249.1, 255.28, 255.29, 255.391, 255.7, 427/255.11, 348, 368, 419.1, 419.2, 419.7
See application file for complete search history.

(56) References Cited

U.S. PATENT DOCUMENTS

| | | | |
|---|---|---|---|
| 4,599,281 A | 7/1986 | Schintlmeister et al. | |
| 4,984,940 A | 1/1991 | Bryant et al. | |
| 5,945,207 A * | 8/1999 | Kutscher et al. | 51/307 |
| 6,015,614 A * | 1/2000 | Ruppi | 428/472 |

(Continued)

FOREIGN PATENT DOCUMENTS

EP 0 127 416 A2 12/1984

(Continued)

OTHER PUBLICATIONS

K. Dreyer et al. "Development and tool life behaviour of super-wear-resistant multilayer coatings on hardmetals." pp. 112-117.

(Continued)

Primary Examiner—Archene Turner
(74) Attorney, Agent, or Firm—Drinker Biddle & Reath LLP (57) ABSTRACT

A cutting tool insert particularly for turning of steel comprising a body and a coating with a first (innermost) layer system of at least two layers of $TiC_xN_yO_z$ with $x+y+z \leq 1$ with a total thickness of from about 0.7 to about 4.5 µm, a second layer system to a large extent consisting of $Al_2O_3$ and an outermost layer system comprising one or several layers in sequence of $TiC_xN_y$ ($x+y \leq 1$) with individual thicknesses of greater than about 0.15 to about 0.8 µm and a layer with $Al_2O_3$ with a thickness greater than about 0.1 to about 0.4 µm with a total thickness of the outermost layer system thinner than about 2.5 µm and a total thickness of the coating in the range of from about 2.0 to about 12.0 µm.

49 Claims, 5 Drawing Sheets

U.S. PATENT DOCUMENTS

| | | | |
|---|---|---|---|
| 6,062,776 A * | 5/2000 | Sandman et al. | 428/216 |
| 6,720,095 B2 * | 4/2004 | Ruppi et al. | 428/702 |
| 2001/0016273 A1 | 8/2001 | Narasimhan et al. | |
| 2002/0187370 A1 * | 12/2002 | Yamagata et al. | 428/698 |
| 2004/0180241 A1 * | 9/2004 | Rodmar et al. | 428/701 |
| 2006/0019117 A1 | 1/2006 | Cedergren et al. | |

FOREIGN PATENT DOCUMENTS

| | | |
|---|---|---|
| EP | 0 298 729 A1 | 1/1989 |
| EP | 0 683 244 A2 | 11/1995 |
| EP | 0 693 574 A1 | 1/1996 |
| EP | 1 103 635 A2 | 5/2001 |
| EP | 1 209 255 A2 | 5/2002 |
| EP | 1 245 698 A2 | 10/2002 |
| EP | 1245700 B1 | 10/2002 |
| EP | 1 455 003 A2 | 9/2004 |
| EP | 1563933 A1 | 8/2005 |
| GB | 2 048 960 | 12/1980 |
| WO | WO 99/58738 | 11/1999 |

OTHER PUBLICATIONS

Ruppi et al., "Microstructure and Deposition Characteristics of $\kappa$-$Al_2O_3$", Proceedings of the Twelfth European Conference on Chemical Vapour Deposition, *J. Phys. IV*, vol. 9, pp. PR8-349 to PR8-355 (1999).

Dreyer et al., "Development and Tool Life Behaviour of Super-Wear-Resistant Multilayer Coatings on Hardmetals", *Metals Society Book* (1982), pp. 112-117.

* cited by examiner

COATED INSERT AND METHOD OF MAKING SAME

BACKGROUND OF THE INVENTION

The present invention relates to a coated cutting tool insert particularly for machining applications with requirements of high wear resistance and toughness behavior of the cutting edge. The coated cutting tool is particularly suitable for turning of steels such as stainless steels.

Cemented carbide cutting tools have been used in the machining of steels for decades. The tool is worn by different mechanisms such as abrasive and chemical wear, chipping or fracturing of the cutting edge limiting the tool life. Besides the chosen cutting data, cutting speed, feed rate and depth-of-cut, external cutting conditions such as off-centered workpiece position and casting skin on the workpiece material will also influence the wear of the tool. In addition, the cutting of stainless steel is considered to be a particularly difficult machining operation since in addition to the above mentioned wear mechanisms also adhesive wear is introduced. Adhesive wear is obtained when smearing material during the cutting operation continuously adheres to and tears off material from the cutting edge. A short tool life is therefore predominant when machining stainless steels. Furthermore, when cutting stainless steels at high cutting speeds, the thermal energy transferred to the cutting edge is considerable and the tool edge may partly or entirely plastically deform. This mode of deterioration of the cutting edge is known as plastic deformation wear. A high degree of plastic deformation resistance is in clear contrast to a requirement of substantial edge toughness.

Multilayer coatings comprising a number of coating layers of different materials which are laminated on the substrate, each of the first coating layers having a first thickness and each of the second coating layers having a second thickness, etc., are known. The layers should preferably have a different crystal structure and/or at least different lattice spacings. One example of such a technique is when the $Al_2O_3$ growth periodically is interrupted by a short TiN deposition process resulting in a $(Al_2O_3+TiN)_x$ multilayer structure see, e.g., Proceedings of the 12:th European CVD Conference page pr. 8-349. GB 2048960A discloses a multilayer coating with a multiplicity of alternating layers of 0.02 to 0.1 μm of hard materials of different compositions. U.S. Pat. No. 4,599,281 discloses a multilayer coating with alternating layers of an aluminium-boron mixed oxide and another oxide layer of e g Ti(C,N,O). Dreyer and Kolaska, Metals Society (Book 278), London, England (1982) 112-117 report an Al—O—N multilayer. In U.S. Pat. No. 4,984,940 Bryant et al. disclose a cutting insert composed of a cemented carbide substrate with 6.1-6.5 wt-% cobalt, a coating including a base layer of titanium carbonitride followed by a multilayered coating consisting of a plurality of alumina layers. A cemented carbide substrate with a coating comprising 6-8 alumina layers is also claimed in U.S. Pat. No. 5,700,569. WO 99/58738 describes a tool consisting of a hard wear resistant substrate and a CVD multilayer of about 50 layers. EP-A-1103635 claims a cutting tool of a cemented carbide substrate with 9.0-10.9 wt-% cobalt and a coating comprising a medium temperature CVD (MTCVD) deposited TiCN-layer and a multilayer composed of totally 7-41 layers of κ-alumina and TiN or Ti(C,N). EP-A-1245698, EP-A-1245700, EP-1209255, EP-1455003, SE 0401636-6 and SE 0401637-4 also relate to multilayer coatings.

Smoothing of coatings by mechanical post treatment in order to, e.g., minimize the friction between the tool and the workpiece is disclosed in EP-A-127416, EP-A-298729, EP-A-693574 and EP-A-683244.

OBJECTS AND SUMMARY OF THE INVENTION

It is an object of the present invention to provide a cutting tool insert able to simultaneously withstand all the above mentioned wear modes and a method of making same.

It is a further object of the present invention to eliminate the deficiencies of prior art tool products and to provide a high performance cutting tool.

It is a still further object of the present invention to provide a tool with excellent cutting performance in demanding smearing steel operations.

In one aspect of the invention, there is provided a cutting tool insert of a body and a coating, said coating comprising:
  a first (innermost) layer system of at least two layers of $TiC_xN_yO_z$ with $x+y+z \leq 1$ with a total thickness of from about 0.7 to about 4.5 μm,
  a second layer system comprising mainly $Al_2O_3$,
  an outermost layer system comprising one or several layers in sequence of $TiC_xN_y$ ($x+y \leq 1$), with individual thicknesses of greater than about 0.15 to about 0.8 μm, adding up to a total thickness of greater than about 0.6 to about 2.0 μm and a layer with $Al_2O_3$ with a thickness greater than about 0.1 to about 0.4 μm adding up to total thickness of the outermost layer system thinner than about 2.5 μm, with the total thickness of the coating in the range from about 2.0 to about 12.0 μm.

In another aspect of the invention, there is provided a method of making a cutting tool insert of a body and a coating wherein said body is produced by mixing of powders, ball milling, spray-drying, pressing followed by sintering and pre-treating according to conventional methods and then coated with
  a first (innermost) layer system of at least two layers of $TiC_xN_yO_z$ with $x+y+z \leq 1$, with a total thickness of from about 0.7 to about 4.5 μm, using for the first layer, known chemical vapor deposition (CVD) methods and for the second layer using known CVD techniques.
  a second layer system comprising mainly $Al_2O_3$,
  an outermost, less than about 2.5 μm, thick layer system comprising one or several layers in sequence of $TiC_xN_y$ ($x+y \leq 1$), with individual thicknesses of greater than about 0.15 to about 0.8 μm and a total thickness of greater than about 0.6 to about 2.0 μm, followed by an $Al_2O_3$ layer with a thickness greater than 0.1 to about 0.4 μm, the total thickness of the coating being in the range of from about 2 to about 12.0 μm.

BRIEF DESCRIPTION OF THE FIGURES

FIG. 3.2 is a schematic of the cross-section of the edge with a post-treatment according to the invention where the outermost coating layers E+F are removed.

FIG. 3.3 is a schematic of the cross-section of the edge with a post-treatment according to the invention where the outermost coating layers E+F and the multilayer $(Al_2O_3+TiN)_x$ $Al_2O_3$ are removed.

DETAILED DESCRIPTION OF THE PREFERRED EMBODIMENT OF THE INVENTION

It has surprisingly been found that a cemented carbide cutting insert with a coating with a plurality of $TiC_xN_yO_z$ and $Al_2O_3$ layers and a certain combination of individual $TiC_xN_yO_z$ and $Al_2O_3$ layer thicknesses when possible including a mechanical post-treatment meet these requirements. The insert exhibits excellent toughness behavior especially edge toughness as well as a good resistance to adhesive wear and to plastic deformation.

More specifically, the invention relates to a substrate, preferably WC+Co-based cemented carbide substrate with additions of cubic carbides, a composition of WC+Co and a coating on the substrate including an innermost thin layer of equiaxed $TiC_xN_yO_z$ followed by a layer of columnar $TiC_xN_yO_z$ a thin layer of equiaxed $TiC_xN_yO_z$, two alternatives with a multilayer with a periodic variation of $TiC_xN_yO_z$ and $Al_2O_3$ layers (x+y+z≦1) or a single $Al_2O_3$ layer and then a layer of $TiC_xN_y$ (x+y≦1) followed by an outermost layer of $Al_2O_3$. There are specific thickness relations between the last two outermost layers and the earlier first and second layer systems in the coating.

In addition, the two outermost layers in an area along the edge-line, defined as the normally edge-honed portion of the tool, material around the cutting edge can be missing.

The composition of a cemented carbide substrate should be from about 7 to about 11.5 wt-% Co and from about 0.2 to about 2.1 wt-% cubic carbides, preferably from about 0.4 to about 1.6 wt-% cubic carbides of the metals Ta, Nb and Ti and possibly other carbides of the elements from group IVb, Vb or VIb of the periodic table and balance tungsten carbide, WC, with an average grain size of from about 1.0 to about 3.0 μm.

In an alternative embodiment, a cemented carbide substrate has a cubic carbide depleted and binder enriched volume near the surface. The measured distance from the surface should be from about 5 to about 50 μm until the end of the cubic carbide depletion. In this embodiment, the composition comprises from about 5.0 to about 10.5 wt-% Co and from about 3.0 to about 9.0 wt-% cubic carbides and balance tungsten carbide, WC, with an average grain size of from about 1.0 to about 3.0 μm. Said cubic carbides may contain substantial amounts of N and O. The cubic carbides are preferably based on Nb, Ta and Ti but may include carbides of elements from group IVb, Vb or VIb of the periodic table. The amount of N should be in the range of from about 0.01 to about 0.2 wt-%.

Figure 1:
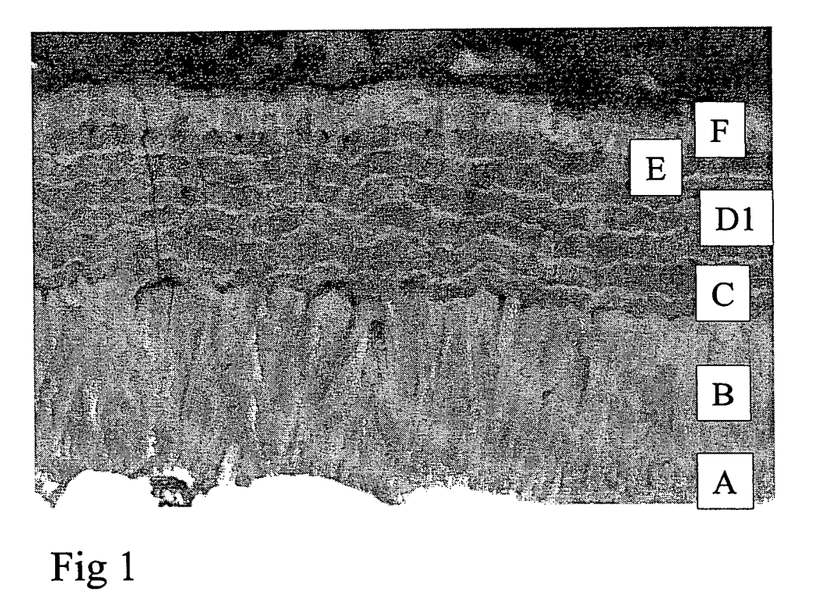
FIG. 1 is a scanning electron micrograph (SEM) of a cross-section of the coating according to the present invention in which:
A=TiN,
B=columnar Ti(C,N),
C=TiN,
D1=multilayer $(Al_2O_3+TiN)_6Al_2O_3$,
E=TiN+TiC+TiN and
F=$Al_2O_3$
Figure 2:
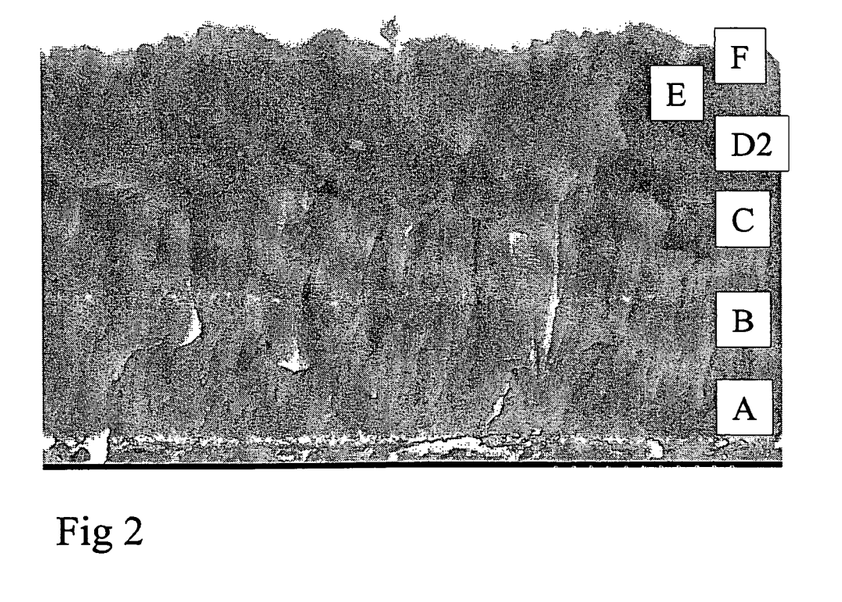
FIG. 2 is a scanning electron micrograph (SEM) of a cross section of the coating according to the present invention according to a second embodiment in which:
A=TiN,
B=columnar Ti(C,N),
C=TiN,
D2=Single layer $Al_2O_3$,
E=TiN+TiC+TiN and
F=$Al_2O_3$ FIG. 3.1 is a schematic of the cross-section of the edge without a post-treatment.
Figure 4:
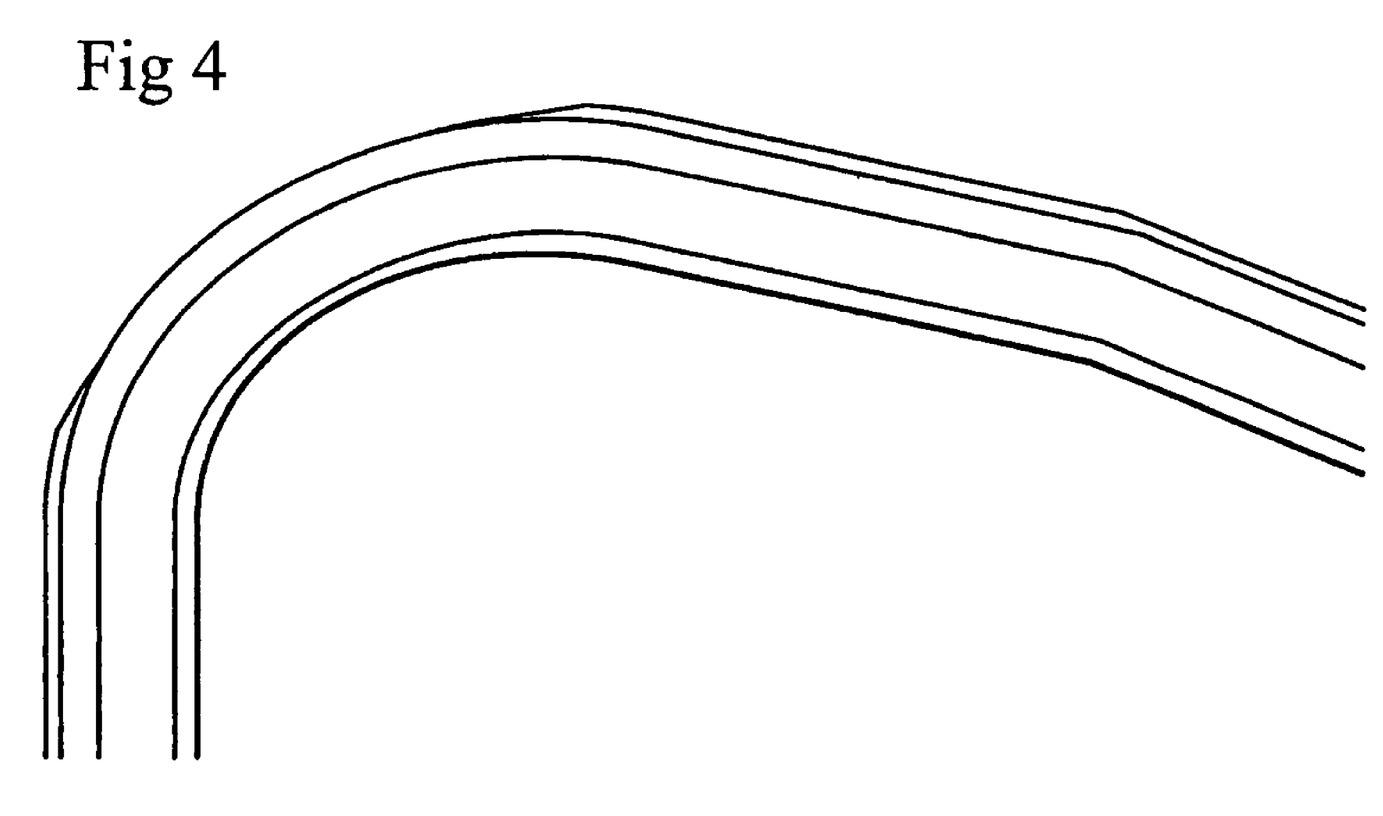
FIG. 4 is a schematic of the cross-section of the edge with a post-treatment according to prior art.

The hard and wear resistant refractory coating (FIGS. 1 and 2) deposited on the above described cemented carbide substrates according to the present invention comprises:

- a first innermost layer (A) of $TiC_xN_yO_z$ with x+y+z≦1, preferably y>x and z<0.2, most preferably y>0.8 and z=0, with equiaxed grains with size less than about 0.5 μm and a total thickness less than about 1.5 μm but greater than about 0.1 μm, preferably from about 0.1 to about 0.6 μm.
- a second layer (B) of $TiC_xN_yO_z$ with x+y+z≦1, preferably with z=0, x>0.3 and y>0.3, most preferably x>0.5, with a thickness of from about 0.4 to about 3.9 μm, preferably from about 1.5 to about 3.0 μm with columnar grains.
- a third layer (C) of $TiC_xN_yO_z$ with x+y+z≦1, preferably y>x and z<0.2, most preferably y>0.8 and z=0, with equiaxed grains with size less than about 0.5 μm and a total thickness less than about 1.5 μm but greater than about 0.1 μm, preferably from about 0.1 to about 0.6 μm as a first embodiment. This layer (C) is as a second embodiment omitted.
- the total thickness of the first layer system A+B+C is from about 0.7 to about 4.5 μm, preferably from about 1.6 to about 4.0 μm. Preferably, the layers A and C are thinner than the layer B.
- a second layer system with a multilayer (D) of a plurality of alternating $Al_2O_3$ and $TiC_xN_yO_z$ (x+y+z≦1) layers, preferably κ-$Al_2O_3$ and TiN layers. The innermost and the outermost layer of the multilayer sequence are preferably $Al_2O_3$ layers. The total number of layers, including both the $TiC_xN_yO_z$ and $Al_2O_3$ layers, are between from about 5 to about 31, preferably from about 11 to about 15 layers. The $Al_2O_3$ layers have an individual layer thickness of greater than about 0.1 to less than about 0.5 μm, preferably from about 0.2 to less than about 0.5 μm. The $TiC_xN_yO_z$ layers have an individual layer thickness of greater than zero but less than about 0.2 μm, preferably from about 0.02 to about 0.15 μm. The total thickness of the multilayer is from about 1.0 to about 4.0 μm, preferably from about 1.5 to about 3.5 μm. The layer D may by a second embodiment be a single layer $Al_2O_3$, preferably κ-$Al_2O_3$ layer, though still referred to as a layer system for reasons of consistent denomination. The total thickness of the single layer is from about 1.0 to about 4.0 μm, preferably from about 1.5 to about 3.5 μm.
- one or several layers (E) in sequence of $TiC_xN_y$ (x+y≦1), preferably a $(TiN+TiC)_n$ TiN, most preferably a TiN+TiC+TiN-combination. The thickness of the individual layers is greater than about 0.15 up to about 0.8 μm and exceeding the thickness of the individual $TiC_xN_yO_z$ layers of D, preferably at least two times. The total thickness (E) should be in the range of greater than about 0.6 to about 2.0 μm.
- an outermost layer (F) with $Al_2O_3$, preferably κ-$Al_2O_3$, with a thickness greater than about 0.1 to about 0.4 μm and preferably thinner than the thickness of individual $Al_2O_3$ layers of D. The thickness of E should be at least two times, preferably 3-5 times, the thickness of F. The total thickness of E and F is less than about 2.5 μm, preferably from about 0.4 to about 1.5 μm.

The total thickness of the layers A-F is from about 2.0 to about 12.0 μm, preferably from about 4.0 to about 7.0 μm.

The outermost part of the coating should preferably be missing around the edge such that the area corresponds to the edge-line. The edge-line is normally defined as the edge-honed portion of the cutting tool insert if an edge-honing operation applies. In one embodiment only, the layers E-F are missing on the edge-line. In another embodiment, layers D-F are missing in a limited length of the edge-line, preferably lower than about 5%. It is preferable that only the outermost layers (E+F) and acceptable that parts of the second layer system (D) are removed.

Figure 31:
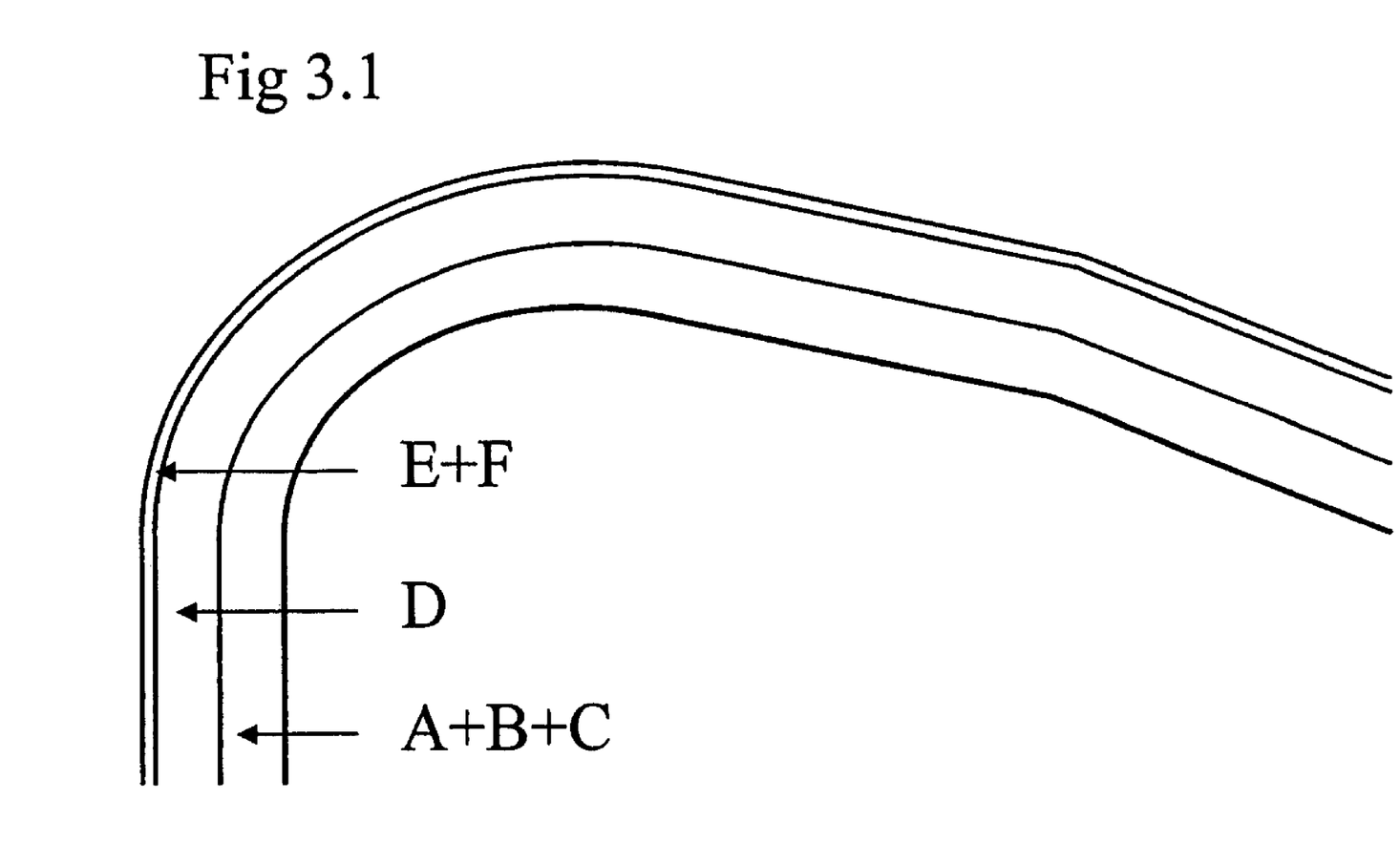
Figure 32:
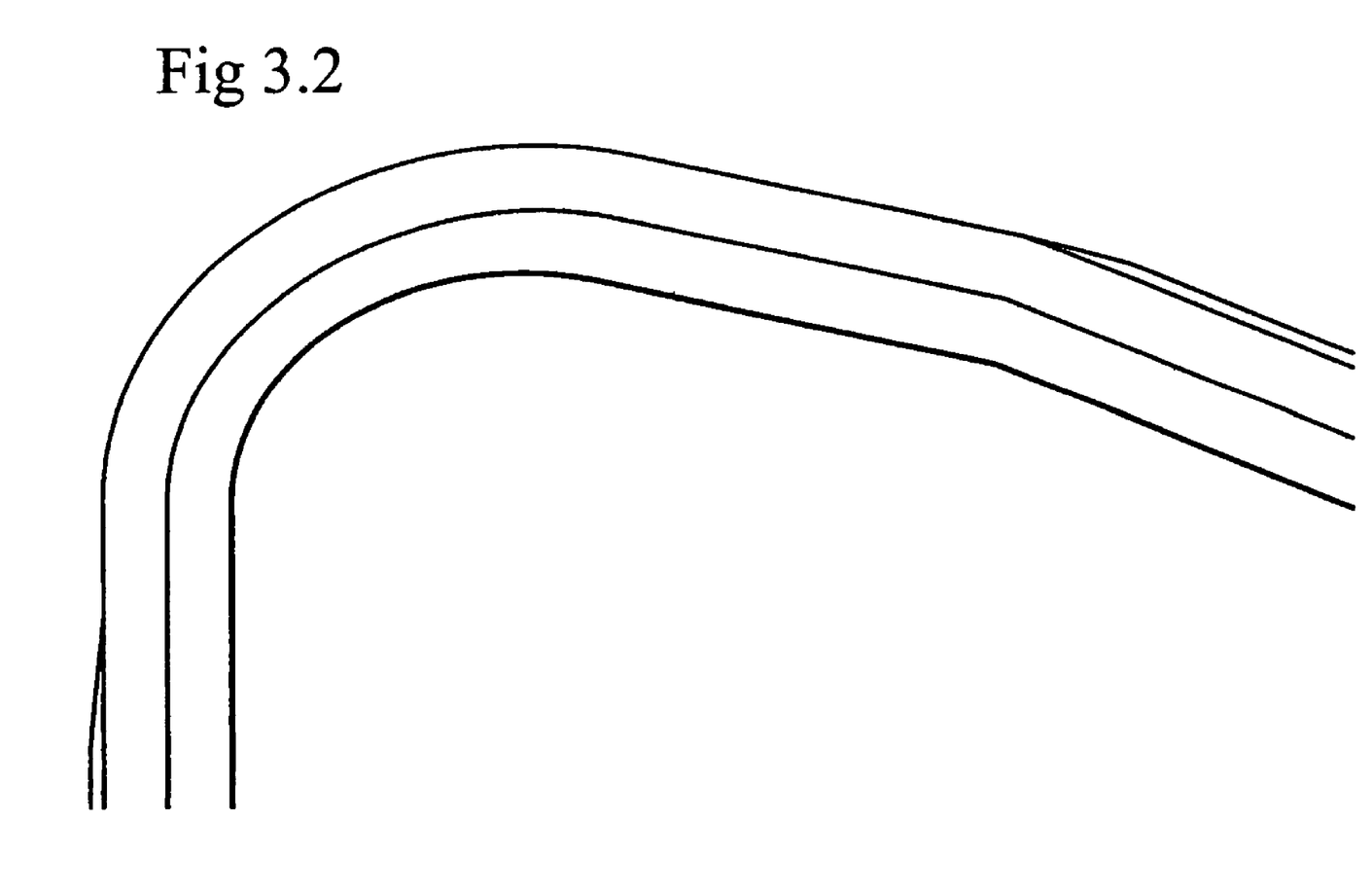
Figure 33:
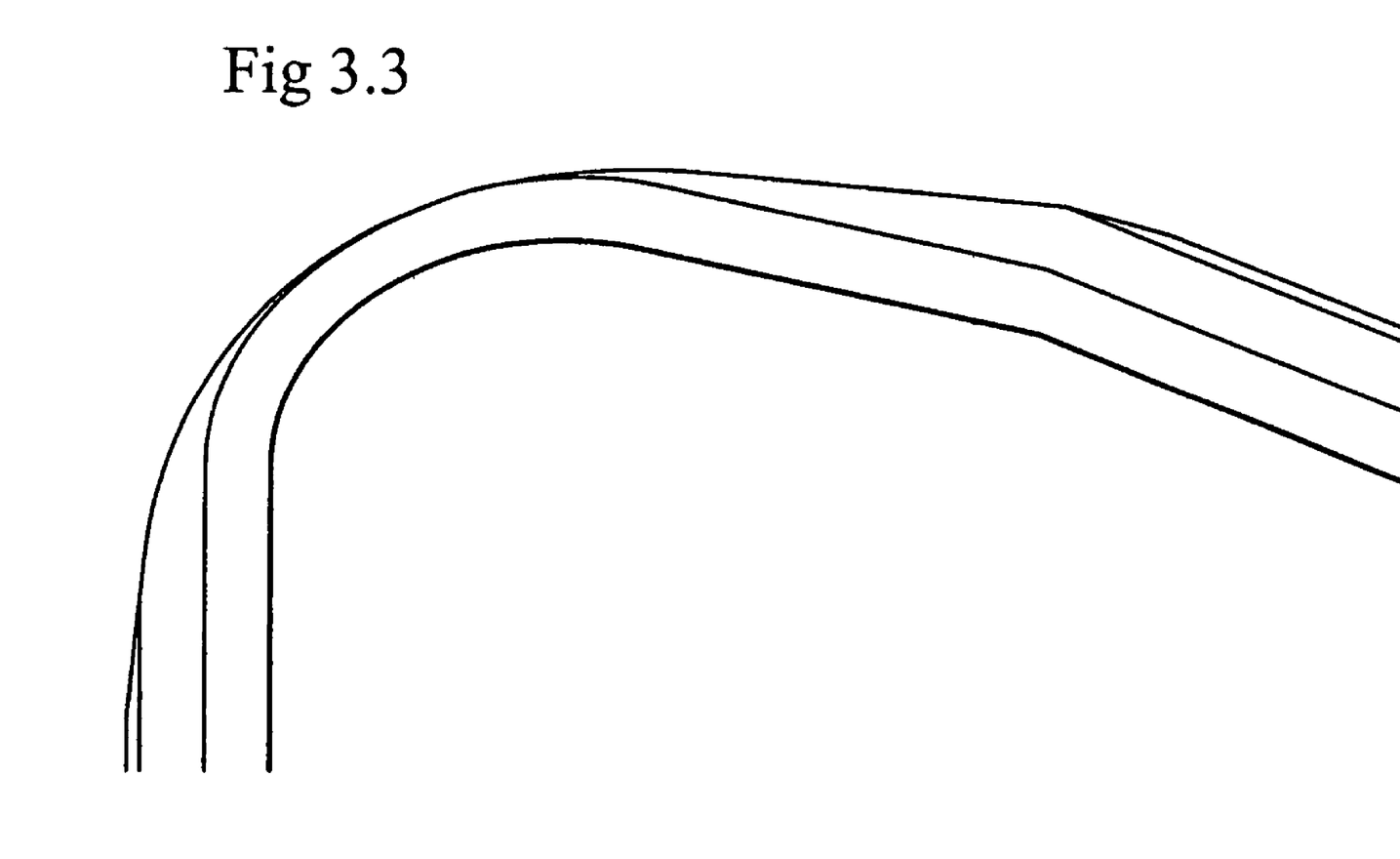

The post-treatment exposes the layers beneath the outermost layers along the edge-line and into the rake and flank face, such that the exposure on the flank and rake face is at least about 0.02 mm, preferably from about 0.02 to about 0.45 mm on the rake face and less on the flank face, which corresponds to the contact length of the chip, most preferably the exposure on the flank face is about half of the exposure on the rake face. The untreated cross-section of edge-line is illustrated in FIG. 3.1 and the post-treated edge-line is illustrated in FIGS. 3.2 and 3.3. The first $TiC_xN_yO_z$ layer system (A+B+C) may, however, be visible on minor parts of the edge line (FIG. 3.3).

The present invention also relates to a method of making the above mentioned coated cutting tool insert comprising preferably a WC-Co based cemented carbide body including from about 7 to about 11.5 wt-% Co and an amount of cubic carbides in the range of from about 0.2 to about 2.1 wt-%, and the balance is made up by WC with an average grain size of from about 1.0 to about 3.0 µm.

In an alternative embodiment, the cemented carbide substrate has a cubic carbide depleted and binder enriched volume near the surface. The measured distance from the surface should be from about 5 to about 50 µm until the end of the cubic carbide depletion. In this embodiment, the composition comprises from about 5.0 to about 10.5 wt-% Co and from about 3.0 to about 9.0 wt-% cubic carbides and balance tungsten carbide, WC, with an average grain size of from about 1.0 to about 3.0 µm. Said cubic carbides may contain substantial amounts of N and O. The cubic carbides are preferably based on Nb, Ta and Ti but may include carbides of elements from group IVb, Vb or VIb of the periodic table. The amount of N should be in the range of from about 0.01 to about 0.2 wt-%.

The cemented carbide body is mainly produced by mixing of powders, ball milling, spray-drying, some pressing method followed by sintering and pre-treatment according to conventional methods before coating.

The body is then coated with a first (innermost) layer (A) of $TiC_xN_yO_z$ with $x+y+z\leqq1$, preferably y>x and z<0.2, most preferably y>0.8 and z=0, with equiaxed grains with size less than about 0.5 µm and a total thickness of less than about 1.5 µm but greater than about 0.1 µm using known chemical vapor deposition, CVD, methods.

a second layer (B) of $TiC_xN_yO_z$ with $x+y+z\leqq1$, preferably with z=0, x>0.3 and y>0.3 with a thickness of from about 0.4 to about 3.9 µm, preferably from about 1.5 to about 3.0 µm with columnar grains, using known CVD methods, preferably a moderate temperature CVD, MTCVD, technique (using acetonitrile as the carbon and nitrogen source for forming the layer in the temperature range of from about 700 to about 900° C.). The exact conditions depend to a certain extent on the design of the equipment used.

a layer (C) of $TiC_xN_yO_z$ with $x+y+z\leqq1$, preferably y>x and z<0.2, most preferably y>0.8 and z=0, with equiaxed grains with size less than about 0.5 µm and a total thickness less than about 1.5 µm but greater than about 0.1 µm using known CVD-methods. This layer (C) is as a second embodiment omitted.

The total thickness of the first layer system according to A+B+C is from about 0.7 to about 4.5 µm.

Preferably, the layers according to A and C are thinner than described by B.

a second layer system (D) with a multilayer of a plurality of alternating $Al_2O_3$ and $TiC_xN_yO_z$ ($x+y+z\leqq1$) layers, preferably $\kappa$-$Al_2O_3$ and TiN layers. The innermost and the outermost layer of the multilayer sequence are $Al_2O_3$ layers. The total number of layers, including both the $TiC_xN_yO_z$ and $Al_2O_3$ layers, are between from about 5 to about 31, preferably from about 11 to about 15 layers. The $Al_2O_3$ layers have an individual layer thickness of greater than about 0.1 to less than about 0.5 µm. The $TiC_xN_yO_z$ layers have an individual layer thickness of greater than zero to less than about 0.2 µm. The total thickness of the multilayer is from about 1.0 to about 4.0 µm. The layer D may by a second embodiment be a single layer $Al_2O_3$, preferably $\kappa$-$Al_2O_3$ layer. The total thickness of the single layer is from about 1.0 to about 4.0 µm.

one or several layers (E) in sequence of $TiC_xN_y$ ($x+y\leqq1$), preferably a $(TiN+TiC)_n$, TiN, most preferably a TiN+TiC+TiN-combination. The thickness of the individual layers is greater than about 0.15 to about 0.8 µm. The total thickness (E) is greater than about 0.6 to about 2.0 µm.

an outermost layer (F) with $Al_2O_3$, preferably $\kappa$-alumina, with a thickness of greater than about 0.1 to about 0.4 µm. This may be followed by another layer according to C and D or E. The total thickness of E and F is less than about 2.5 µm.

The total thickness of layers A-F is from about 2.0 to about 12.0 µm.

The coating should preferably be mechanically post-treated to expose the layer D along the edge line by a brushing, blasting, grinding operation or combinations thereof such that the areas on the rake and flank face with chip and work piece contact respectively have been treated.

In the most preferred method, two nylon brushes containing SiC grains with settings and insert positioning such that one brush mainly brushes the rake side and the other mainly the flank side to achieve the desired properties on the flank and rake face of the insert.

The invention is additionally illustrated in connection with the following Examples which are to be considered as illustrative of the present invention. It should be understood, however, that the invention is not limited to the specific details of the Examples.

EXAMPLES

The following inserts and examples were selected to exemplify the advantages with the invention.

The presented inserts have been tested identical conditions in each example.

Insert A. Commercial cemented carbide turning inserts having 10.5 wt-% Co, 1.24 wt-% TaC, 0.32 wt-% NbC and balance made up by WC and with an average grain size of 1.7 µm, was coated with an innermost 0.5 µm equiaxed TiN layer, 4.0 µm columnar TiCN, 1.0 µm $\kappa$-$Al_2O_3$, and an outermost layer of 0.5 µm TiN+TiC+TiN. The coating was brushed along the edge line with nylon straw brushes containing SiC grains. The outermost layers E-F were removed primary along the edge line about 0.05 mm into the rake and flank face according to prior art.

Insert B. The same substrate as in A was coated with an innermost 0.5 µm equiaxed TiN layer, 2.5 µm columnar TiCN, a 2.1 µm multilayer with 5 separation layers, ($\kappa$-$Al_2O_3$/TiN)$_5\kappa$-$Al_2O_3$, a layer of 0.7 µm TiN+TiC+TiN and an outermost layer of 0.2 µm Al$_2$O$_3$. The coating was post-treated along the edge line with nylon brushes containing SiC grains. The outermost layers E-F were brushed primary along the edge line according to prior art as insert A.

Insert C. Insert with same substrate and coating to insert B were not post-treated.

Insert D. Insert with same substrate and coating to insert B were post-treated along the edge line with nylon brushes containing SiC grains. The outermost layers E-F were brushed 0.11 mm from the edge line into the rake and about 0.05 mm on flank face.

Insert E. Cemented carbide turning inserts having 9.15 wt-% Co, 1.23 wt-% TaC, 0.30 wt-% NbC and balance made up by WC and with an average grain size of 1.7 µm, was coated with an innermost 0.5 µm equiaxed TiN layer, 2.7 µm columnar TiCN, 1.8 µm κ-Al$_2$O$_3$, and an outermost layer of 0.5 µm TiN+TiC+TiN. The coating was brushed along the edge line with nylon brushes containing SiC grains. The outermost coating layers E were removed primary along the edge line about 0.05 mm into the rake and flank face according to prior art. The coating layer D was removed on spots corresponding to less than 5% of the edge line.

Insert F. The same substrate as in E was coated with an innermost 0.5 µm equiaxed TiN layer, 2.5 µm columnar TiCN, a 2.1 µm multilayer with 5 separation layers, (κ-Al$_2$O$_3$/TiN)$_5$κ-Al$_2$O$_3$ an outermost layer of 0.5 µm TiN+TiC+TiN. The coating was post-treated along the edge line with nylon brushes containing SiC grains. The outermost coating layer E was brushed primary along the edge line according as insert D.

Insert G. Inserts with the same substrate to insert E was coated with an innermost 0.5 µm equiaxed TiN layer, 2.8 µm columnar TiCN, 1.9 µm κ-Al$_2$O$_3$. The coating was post-treated along the edge line with nylon brushes containing SiC grains. The outermost coating layer D were brushed primary along the edge line as insert E.

Insert H. Inserts with the same substrate to insert E was coated with an innermost 0.5 µm equiaxed TiN layer, 2.8 µm columnar TiCN, 1.8 µm κ-Al$_2$O$_3$, a layer of 0.9 µm TiN+TiC+TiN and an outermost layer of κ-Al$_2$O$_3$ with a thickness of 0.3 µm. The coating was post-treated along the edge line with nylon brushes containing SiC grains. The outermost coating layers E and F were brushed primary along the edge line as insert E.

Example 1

Inserts from A-D were tested in a turning operation.

| | |
|---|---|
| Operation: | Axial and facial turning in a bar |
| Work piece material: | Austenitic stainless steel AISI 304L |
| Cutting Speed: | 225 m/min |
| Feed rate: | 0.3 mm/rev |
| Depth of cut: | 2.0 mm |
| Insert style: | CNMG120408-MM |
| Results: | Tool life (min) |
| Insert A: (prior art) | ca 6 |
| Insert B: (invention) | ca 7 |
| Insert C: (invention) | ca 7 |
| Insert D: (invention) | ca 7 |

Comment: Tool life criterion was maximum flank wear 0.3 mm of the cutting edge line. The wear develops irregularly due to local plastic deformation. This test shows at least an equal result compared to prior art and reference.

Example 2

Inserts from A-D were tested in a turning operation.

| | |
|---|---|
| Operation: | Combined facing and longitudinal turning |
| Work piece material: | Austenitic stainless steel, AISI316Ti |
| Cutting speed: | 110 m/min |
| Feed rate: | 0.3 mm/rev |
| Depth of cut: | 2.0 mm |
| Insert style: | CNMG120408-MM |
| Results: | Average tool life in cycles |
| | (Total damaged edge outside cut) |
| Insert A: (prior art) | 8.7 (23.5 mm) |
| Insert B: (invention) | 11.7 (15.0 mm) |
| Insert C: (invention) | 14.3 (25.5 mm) |
| Insert D: (invention) | 13.6 (7.9 mm) |

Comment: The tool life determining wear is notch wear at the cutting depth (tool life criterion >0.4 mm) and as additional criterion the length of chipping outside the part of the edge in cut is evaluated. This is a toughness demanding operation.

The example shows that present invention adds edge toughness compared to prior art.

Together with example 1 this shows a remarkable improvement in performance even without post-treatment when the damage length still is comparable to prior art.

Example 3

Inserts from E-H were tested in a turning operation.

| | |
|---|---|
| Operation: | Facing of a bar |
| Work piece material: | Austenitic stainless steel AISI 304L |
| Cutting Speed: | 140 m/min |
| Feed rate: | 0.36 mm/rev |
| Depth of cut: | Change from 4.0 mm to 0 mm first pass and 0 mm to 4.0 mm in a second pass per cycle |
| Insert style: | CNMG120408-MM |
| Results: | Standardized flaked area |
| Insert E: (outside invention) | 1 |
| Insert F: (outside invention) | ca 1 |
| Insert G: (outside invention) | ca 1.5 |
| Insert H: (invention) | ca 0.4 |

Comment: The measured totally flaked area on rake face shows a better performance of the invention.

Example 4

Inserts from E-H were tested in a turning operation.

| | |
|---|---|
| Operation: | Axial and facial turning in a bar |
| Work piece material: | Austenitic stainless steel AISI 304L |
| Cutting Speed: | 225 m/min |
| Feed rate: | 0.3 mm/rev |
| Depth of cut: | 2.0 mm |
| Insert style: | CNMG120408-MM |
| Results: | Standardized tool life |
| Insert E: (outside invention) | 1 |
| Insert F: (outside invention) | ca 1.2 |
| Insert G: (outside invention) | ca 1.2 |
| Insert H: (invention) | ca 1.9 |

Comment: Tool life criterion was maximum flank wear 0.3 mm of the cutting edge line. The wear develops irregularly due to local plastic deformation. This test shows a better performance in this respect.

As a conclusion it can be stated that from the result of the examples given above it is evident that by combining a substrate and the selection of a coating with specified thicknesses and eventually the edge treatment a tool insert has been created with excellent cutting performance in that it combines much of what was believed to be contradictory properties as described in the introduction.

The principles, preferred embodiments and modes of operation of the present invention have been described in the foregoing specification. The invention which is intended to be protected herein, however, is not to be construed as limited to the particular forms disclosed, since these are to be regarded as illustrative rather than restrictive. Variations and changes may be made by those skilled in the art without departing from the spirit of the invention.

What is claimed is:

1. A cutting tool including a body and a coating, said coating comprising:
    a first (innermost) layer system of at least two layers of $TiC_xN_yO_z$ with $x+y+z \leq 1$ with a total thickness of from about 0.7 to about 4.5 µm,
    a second layer system consisting of a single $Al_2O_3$-layer,
    an outermost layer system comprising one or several layers in sequence of $TiC_xN_y$ ($x+y \leq 1$), with individual thicknesses of greater than about 0.15 to about 0.8 µm, adding up to a total thickness of greater than about 0.6 to about 2.0 µm and a layer with $Al_2O_3$ with a thickness greater than about 0.1 to about 0.4 µm adding up to total thickness of the outermost layer system thinner than about 2.5 µm,
    with the total thickness of the coating in the range from about 2.0 to about 12.0 µm.

2. The cutting tool of claim 1 wherein the outermost layer system comprises several layers in sequence of $TiC_xN_y$ ($x+y \leq 1$) followed by an $Al_2O_3$ layer, having a layer thickness ratio $TiC_xN_y/Al_2O_3 \leq 2$.

3. The cutting tool of claim 2 wherein the layer thickness ratio $TiC_xN_y/Al_2O_3$ is from about 3 to about 5.

4. The cutting tool of claim 1 wherein the single $Al_2O_3$-layer has a total thickness of from about 1.0 to about 4.0 µm.

5. The cutting tool of claim 4 wherein the said single $Al_2O_3$ layer is $\kappa$-$Al_2O_3$ and the total thickness of the layer is from about 1.5 to about 3.5 µm.

6. The cutting tool of claim 1 wherein the first (innermost) layer system comprises:
    a first innermost layer consisting of $TiC_xN_yO_z$ with $x+y+z \leq 1$, with equiaxed grains with size less than about 0.5 µm and a thickness less than about 1.5 µm but greater than about 0.1 µm,
    a second layer of $TiC_xN_yO_z$ with $x+y+z \leq 1$, with a thickness of from about 0.4 to about 3.9 µm, with columnar grains.

7. The cutting tool of claim 6 wherein the first (innermost) layer system further comprises:
    a third layer of $TiC_xN_yO_z$ with $x+y+z \leq 1$ with equiaxed grains with size less than about 0.5 µm and a thickness less than about 1.5 µm but greater than about 0.1 µm.

8. The cutting tool of claim 7 wherein in said third layer, $y>x$ and $z<0.2$, the thickness of said layer being from about 0.1 to about 0.6 µm and the two layers with equiaxed grains are thinner than the layer with columnar grains.

9. The cutting tool of claim 6 wherein in said first innermost layer, $y>x$ and $z<0.2$; and the thickness of said first layer is from about 0.1 to about 0.6 µm; in said second layer, $z=0$, $x>0.3$ and $y>0.3$, the thickness of the said second layer is from about 1.5 to about 3.0 µm; and the layer with the equiaxed grains is thinner than the layer with the columnar grains.

10. The cutting tool of claim 9 wherein in said first innermost layer, $Y>0.8$ and $z=0$; and in said second layer $x>0.5$.

11. The cutting tool of claim 1 wherein there is a post-treatment exposing the layers beneath the outermost layers along the edge-line and into the rake and flank face, such that the exposure on the flank and rake face is at least about 0.02 mm.

12. The cutting tool of claim 11 wherein the exposure on the flank and rake face is from about 0.02 to about 0.45 mm on the rake face and less on the flank face.

13. The cutting tool of claim 12 wherein the exposure on the flank face is about half of the exposure on the rake face.

14. The cutting tool of claim 1 wherein the substrate body comprises a cemented carbide substrate containing from about 7 to about 11.5 wt-% Co, from about 0.2 to about 2.1 wt-% cubic carbides and balance tungsten carbide, WC, with an average grain size of from about 1.0 to about 3.0 µm.

15. The cutting tool of claim 14 wherein said cemented carbide substrate contains from about 0.4 to about 1.6 wt-% cubic carbides based on Ta, Nb, Ti.

16. The cutting tool of claim 1 wherein the substrate body comprises a cemented carbide substrate comprising a cubic carbide depleted and binder enriched volume near the surface, the measured distance from the surface being from about 5 to about 50 µm until the end of the cubic carbide depletion, the composition comprises from about 5.0 to about 10.5 wt-% Co, from about 3.0 to about 9.0 wt-% cubic carbides and balance tungsten carbide, WC, with an average grain size of from about 1.0 to about 3.0 µm.

17. The cutting tool of claim 16 wherein said cubic carbides are based on Ta, Nb and Ti and N is present in an amount of from about 0.01 to about 0.2 wt-%.

18. The cutting tool of claim 1 wherein said first (innermost) layer system has a total thickness of from about 1.6 to about 4.0 µm; said outermost layer system comprises TiN+TiC+TiN and a layer of $\kappa$-$Al_2O_3$ with the total thickness of the outermost layer system being from about 0.4 to about 1.5 82 m; and the total thickness of the coating being from about 4.0 to about 7.0 µm.

19. A cutting tool comprising a body and a coating, said coating including:
    a first (innermost) layer system of at least two layers of $TiC_xN_yO_z$ with $x+y+z \leq 1$ with a total thickness of from about 0.7 to about 4.5 µm;
    a second layer system comprising a multilayer system including an $Al_2O_3$-layer;
    a further layer system comprising one or several layers of $TiC_xN_y$ ($x+y \leq 1$), with individual thicknesses of greater than about 0.15 to about 0.8 µm, adding up to a total thickness of greater than about 0.6 to about 2.0 µm; and
    an outermost layer of $Al_2O_3$ with a thickness greater than about 0.1 to about 0.4 µm,
    wherein a total thickness of the coating in the range from about 2.0 to about 12.0 µm.

20. The cutting tool of claim 19 wherein a layer thickness ratio $TiC_xN_y/Al_2O_3$ in the one or several layers of $TiC_xN_y$ and the outermost layer of $Al_2O_3$ is greater than two.

21. The cutting tool of claim 20 wherein the layer thickness ratio $TiC_xN_y/Al_2O_3$ is from about 3 to about 5.

22. The cutting tool of claim 20, wherein the one or several layers of $TiC_xN_y$ is a TiN+TiC+TiN-combination.

23. The cutting tool of claim 19 wherein the second layer system comprises a plurality of alternating $Al_2O_3$ and $TiC_x$ $N_yO_z$ layers, the total number of layers, including both the $Al_2O_3$ and $TiC_xN_yO_z$ layers, being between from about 5 to about 31 layers, the $Al_2O_3$ layers having an individual layer thickness of greater than about 0.1 to less than about 0.5 µm, the $TiC_xN_yO_z$ layers having an individual layer thickness of greater than zero to less than about 0.2 µm, the total thickness of the multilayer being from about 1.0 to about 4.0 µm.

24. The cutting tool of claim 23 wherein the second layer system comprises alternating layers of κ-$Al_2O_3$ and TiN; the total number of said layers is from about 11 to about 15; the individual $Al_2O_3$ layer thickness is from about 0.2 to less than about 0.5 µm, the individual TiN layer thickness is from about 0.02 to about 0.15 µm; and the total thickness of the multilayer is from about 1.5 to about 3.5 µm.

25. The cutting tool of claim 19 wherein the first (innermost) layer system comprises:
 a first innermost layer consisting of $TiC_xN_yO_z$ with $x+y+z \leq 1$ with equiaxed grains with size less than about 0.5 µm and a thickness less than about 1.5 µm but greater than about 0.1 µm, and
 a second layer of $TiC_xN_yO_z$ with $x+y+z \leq 1$, with a thickness of from about 0.4 to about 3.9 µm, with columnar grains.

26. The cutting tool of claim 25 wherein in said first innermost layer, $y>x$ and $z<0.2$; and the thickness of said first layer is from about 0.1 to about 0.6 µm; in said second layer, $z=0$, $x>0.3$ and $y>0.3$, the thickness of the said second layer is from about 1.5 to about 3.0 µm; and the layer with the equiaxed grains is thinner than the layer with the columnar grains.

27. The cutting tool of claim 26 wherein in said first innermost layer, $y>0.8$ and $z=0$; and in said second layer $x>0.5$.

28. The cutting tool of claim 25 wherein the first (innermost) layer system further comprises:
 a third layer of $TiC_xN_yO_z$ with $x+y+z \leq 1$ with equiaxed grains with size less than about 0.5 µm and a thickness less than about 1.5 µm but greater than about 0.1 µm.

29. The cutting tool of claim 28 wherein in said third layer, $Y>x$ and $z<0.2$, the thickness of said layer being from about 0.1 to about 0.6 µm and the two layers with equiaxed grains are thinner than the layer with columnar grains.

30. The cutting tool of claim 19 wherein the layers beneath the outermost layer are exposed along the edge-line and into the rake and flank face by a post-treatment, such that the exposure on the flank and rake face is at least about 0.02 mm.

31. The cutting tool of claim 30 wherein the exposed layers are the further layer system.

32. The cutting tool of claim 30 wherein the exposed layers are the second layer system.

33. The cutting tool of claim 30 wherein the exposure on the flank and rake face is from about 0.02 to about 0.45 mm on the rake face and less on the flank face.

34. The cutting tool of claim 33 wherein the exposure on the flank face is about half of the exposure on the rake face.

35. The cutting tool of claim 19 wherein the substrate body comprises a cemented carbide substrate containing from about 7 to about 11.5 wt-% Co, from about 0.2 to about 2.1 wt-% cubic carbides and balance tungsten carbide, WC, with an average grain size of from about 1.0 to about 3.0 µm.

36. The cutting tool of claim 35 wherein said cemented carbide substrate contains from about 0.4 to about 1.6 wt-% cubic carbides based on Ta, Nb, Ti.

37. The cutting tool of claim 19 wherein the substrate body comprises a cemented carbide substrate comprising a cubic carbide depleted and binder enriched volume near the surface, the measured distance from the surface being from about 5 to about 50 µm until the end of the cubic carbide depletion, the composition comprises from about 5.0 to about 10.5 wt-% Go, from about 3.0 to about 9.0 wt-% cubic carbides and balance tungsten carbide, WC, with an average grain size of from about 1.0 to about 3.0 µm.

38. The cutting tool of claim 37 wherein said cubic carbides are based on Ta, Nb and Ti and N is present in an amount of from about 0.01 to about 0.2 wt-%.

39. The cutting tool of claim 19 wherein said first (innermost) layer system has a total thickness of from about 1.6 to about 4.0 µm, and wherein the total thickness of the coating is from about 4.0 to about 7.0 µm.

40. The cutting tool of claim 19 wherein said outermost layer is a layer of κ-$Al_2O_3$.

41. A method of making a cutting tool insert of a body and a coating wherein said body is produced by mixing of powders, ball milling, spray-drying, pressing method, followed by sintering and pre-treating according to conventional methods and then coated with
 a first (innermost) layer system of at least two layers of $TiC_xN_yO_z$ with $x+y+z \leq 1$ with a total thickness of from about 0.7 to about 4.5 µm, using for the first layer, known chemical vapor deposition (CVD) methods and for the second layer using known CVD techniques,
 a second layer system comprising mainly $Al_2O_3$,
 an outermost, less than about 2.5 µm, thick layer system comprising one or several layers in sequence of $TiC_xN_y$, ($x+y \leq 1$), with individual thicknesses of less than about 0.15 to about 0.8 µm and a total thickness of greater than about 0.6 to about 2.0 µm, followed by an $Al_2O_3$ layer with a thickness greater than 0.1 to about 0.4 µm, the total thickness of the coating being in the range of from about 2 to about 12.0 µm.

42. The method of claim 41 wherein said body is a cemented carbide.

43. The method of claim 42 wherein said cemented carbide comprises from about 7 to about 11.5 wt-% Co, from about 0.2 to about 2.1 wt-% cubic carbides, balance WC.

44. The method of claim 41 wherein the outermost layer is from about 0.4 to about 1.5 µm thick.

45. The method of claim 41 wherein the coated body is post-treated to remove a portion of the coating and expose the $Al_2O_3$ layer along an edge line.

46. The method of claim 45 wherein said post-treating comprises brushing, blasting and/or grinding of said body.

47. The method of claim 46 wherein said body is post-treated with nylon brushes.

48. The method of claim 41 wherein said layer is formed using moderate temperature CVD (MTCVD) techniques.

49. The method of claim 28 wherein said MTCVD includes using acetonitrile as the carbon and nitrogen source at a temperature of from about 700 to about 900° C.

* * * * *